Figure 1:
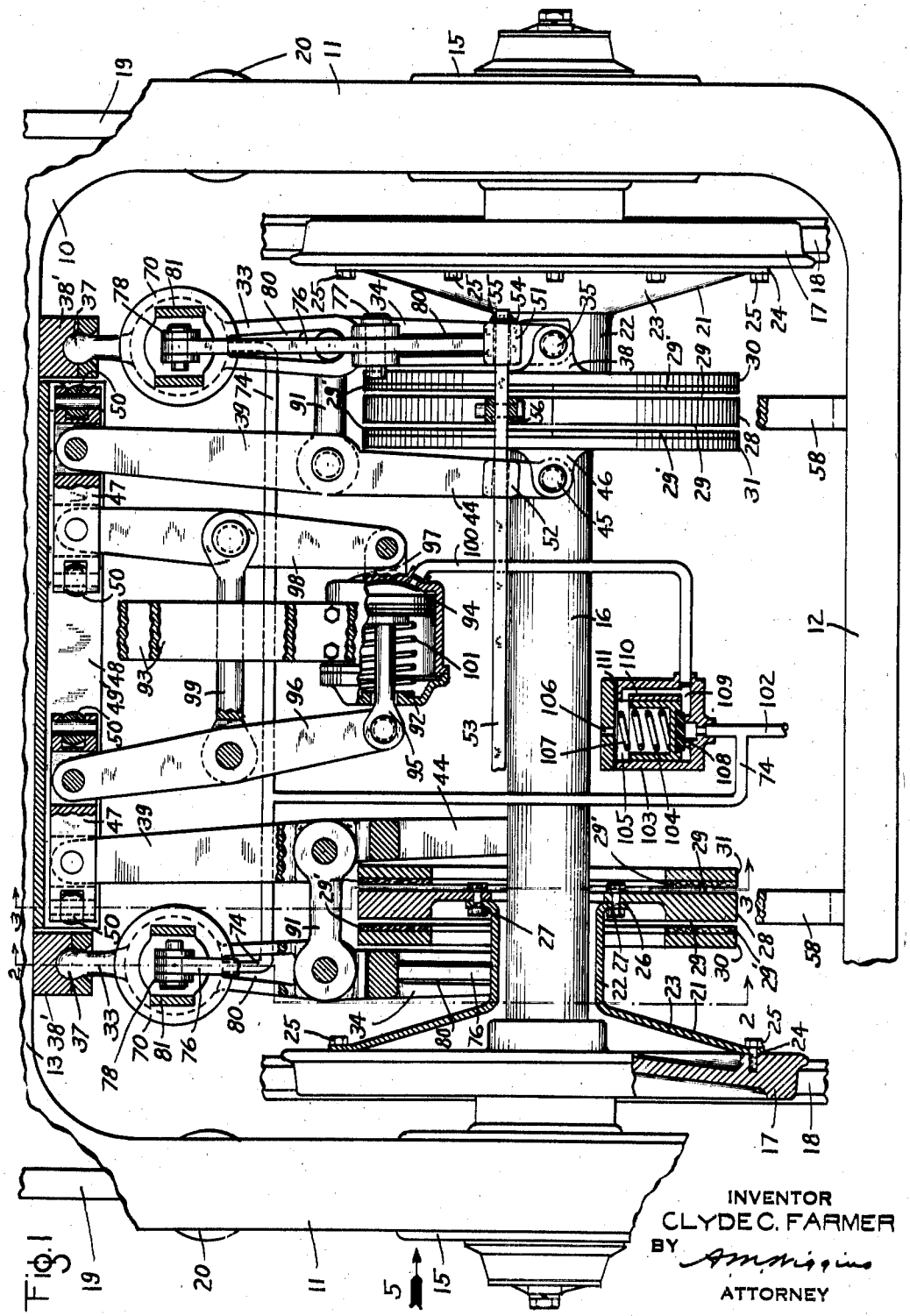

Sept. 26, 1939.  C. C. FARMER  2,174,403
DISK BRAKE FOR RAILWAY VEHICLES
Filed March 29, 1938  4 Sheets-Sheet 1

INVENTOR
CLYDE C. FARMER
BY
ATTORNEY

Sept. 26, 1939.  C. C. FARMER  2,174,403
DISK BRAKE FOR RAILWAY VEHICLES
Filed March 29, 1938  4 Sheets-Sheet 2
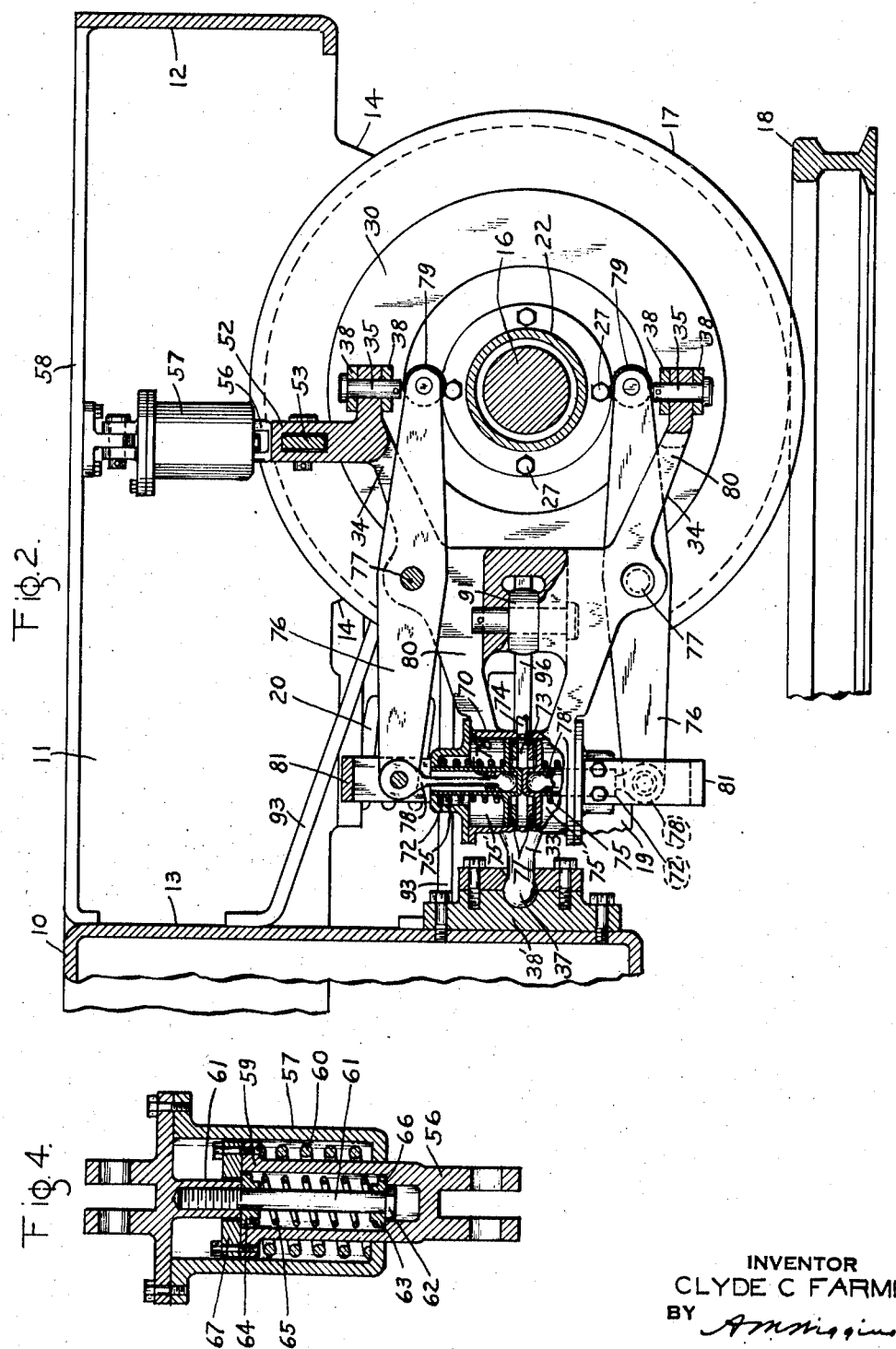
INVENTOR
CLYDE C FARMER
BY
ATTORNEY

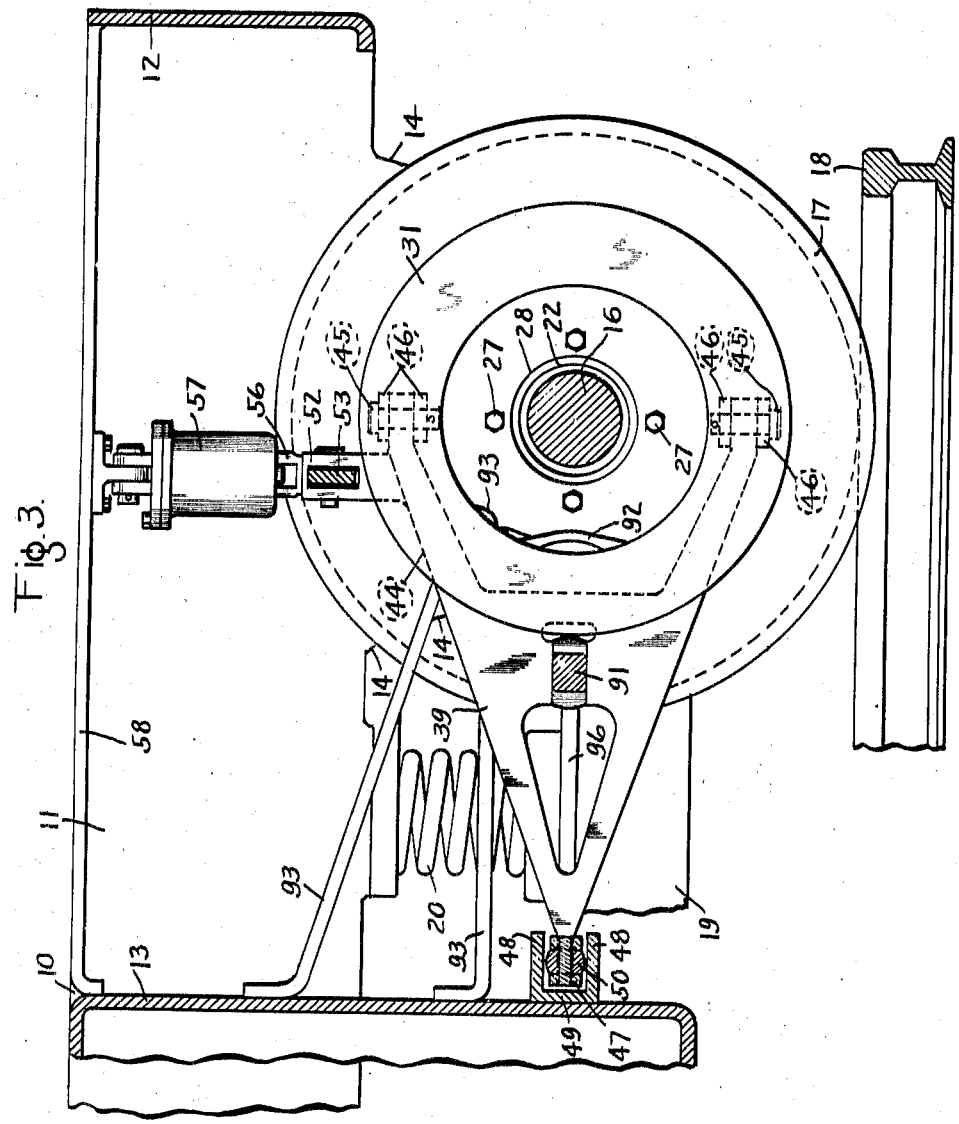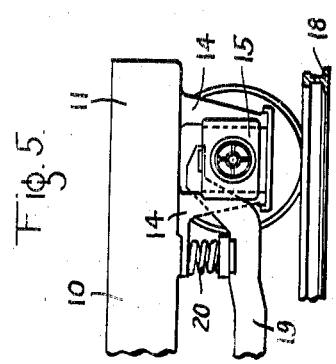

Sept. 26, 1939.    C. C. FARMER    2,174,403
DISK BRAKE FOR RAILWAY VEHICLES
Filed March 29, 1938    4 Sheets-Sheet 4

INVENTOR
CLYDE C. FARMER
BY
ATTORNEY

Patented Sept. 26, 1939

2,174,403

UNITED STATES PATENT OFFICE 2,174,403

DISK BRAKE FOR RAILWAY VEHICLES

Clyde C. Farmer, Pittsburgh, Pa., assignor to The Westinghouse Air Brake Company, Wilmerding, Pa., a corporation of Pennsylvania Application March 29, 1938, Serial No. 198,641

26 Claims. (Cl. 188—59)

This invention relates to brake mechanism for vehicles and more particularly to the friction disk type for use in braking the wheels on railway vehicle trucks.

Disk brake mechanisms for the wheels of vehicles usually comprise rotatable friction elements carried by and rotatable with the wheels to be braked and non-rotatable friction elements adapted to be forced against the rotatable elements for effecting braking thereof and of the connected wheels, and means in one form or another for controlling the movement of the non-rotatable elements into and out of frictional braking engagement with the rotatable elements.

One object of the present invention is to provide an improved disk brake mechanism in which the rotatable elements are carried by the vehicle wheels, while the non-rotatable elements and the means for controlling the operation thereof are carried by the vehicle truck frame which is spring supported on the wheels.

By this arrangement the major portion of the weight of the disk brake mechanism is carried by the sprung portion of the vehicle truck in order to avoid excessive pounding of the truck wheels against rail joints or the like and consequent possible damage to either or both of the wheels and rails and possibly other parts of the truck.

Since the frame of a vehicle truck is resiliently supported on the truck wheels it is capable of movement vertically relative to the wheels due to different degrees of load carried by the truck or due to vibration while the truck is in motion and it will therefore be evident that the non-rotatable elements of my improved mechanism will at different times assume various positions eccentric to the rotatable elements secured to the wheel.

Another object of the invention is therefore to provide means for moving the non-rotatable elements of my improved mechanism relative to the truck frame into concentric, cooperative relationship with the rotatable elements carried by the wheels at the time an application of the brakes is being effected, and a still further object of the invention is to provide means for accurately defining the centralized position in which this relationship is obtained and for holding said non-rotatable elements in concentric relationship with the rotatable elements while the brakes are applied.

According to the last two objects, the parts of the brake mechanism carried by the truck frame are resiliently supported therefrom on one or more springs and centralizing means are provided which are adapted to operate at the time an application of the brakes is initiated to move said parts into cooperative, concentric relationship with the rotatable elements carried by the wheels.

A still further object of the invention is to provide an improved fluid pressure brake equipment embodying a disk brake mechanism for braking the wheels on a vehicle truck and adapted to be controlled by a conventional type of fluid pressure controlled brake cylinder device carried by the truck frame.

Other objects and advantages will be apparent from the following more detailed description of the invention.

Figure 6:
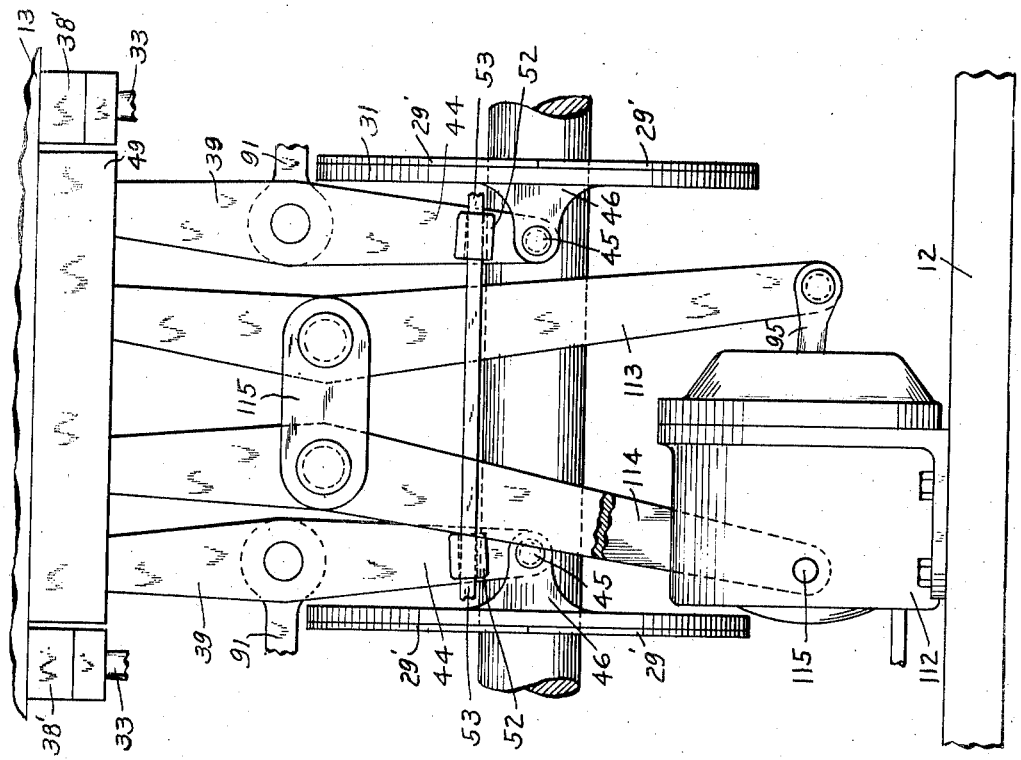

In the accompanying drawings, Fig. 1 is a plan view of a portion of a vehicle truck showing, partly in section and partly in outline, the invention applied thereto; Figs. 2 and 3 are sectional views taken on the lines 2—2 and 3—3 in Fig. 1; Fig. 4 is sectional view of a device shown in elevation in Figs. 2 and 3; Fig. 5 is a side view of a portion of a vehicle truck taken in the direction of arrow 5 in Fig. 1; and Fig. 6 is a plan view of a modified form of the invention.

As shown in the drawings the invention is applied to a vehicle truck which for the purpose of illustration may comprise a truck frame 10 having spaced side members 11 connected together by the usual transversely extending end members 12 and transoms 13, only one end member and transom being shown.

The side members 11 are provided with the usual spaced pedestals 14 slidably mounted on journal boxes 15 in which the two ends of an axle 16 are journalled. A pair of wheels 17 are secured to axle 16 between the journal boxes 15 in the usual spaced relationship for rolling on track rails 18.

The truck shown in the drawings is of the type having equalizing bars 19 at each of the opposite sides which bars are carried by the journal boxes 15 and which carry springs 20 upon which the truck frame 10 is resiliently supported.

According to the invention there is disposed, preferable adjacent the inner face of each of the wheels 17, a disk brake mechanism, both of which mechanisms are of like construction but oppositely disposed.

Each of these mechanisms comprises a rigid sleeve 21 encircling the axle 16 a d having a central cylindrical portion 22 arranged concentric with the adjacent wheel 17 and joined at its outer end to an outwardly flaring frusto-conical shaped portion 23 having at its outer periphery an annular flange 24 which is rigidly secured to the adjacent wheel 17 near the periphery or tread thereof in any desired manner as by bolts 25. Each of the sleeve 21 is provided at its inner end with an outwardly extending annular flange 26 to which there is rigidly secured in any desired manner, as by bolts 27, an annular rotatable friction braking element 28 preferably made in two complementary sections to facilitate replacement and having oppositely disposed friction faces 29. It will be noted that both of the rotatable braking elements 28 are rigidly secured to the adjacent wheels 17 and are adapted to rotate therewith.

An annular non-rotatable friction braking element 30 encircling the axle 16 is disposed adjacent the outer friction face 29 of each of the rotatable elements 28, and a like non-rotatable friction braking element 31 is disposed adjacent the inner face 29 of each rotatable element 28, each of the non-rotatable elements being provided on the face adjacent the rotatable elements with an annular, ring like friction element 29' for frictionally engaging the rotatable elements. These friction elements 29' may be metallic, fibrous or any other suitable material and are preferably made in complementary sections in order to facilitate replacement. The non-rotatable elements 30 and 31 are of substantially the same diameter as the rotatable elements 28 but are provided centrally with openings to permit movement relative to axle 16 in a vertical direction, for reasons which will be apparent later.

A substantially horizontally disposed Y-shaped lever or arm 33 is provided between each of the non-rotatable braking elements 30 and the adjacent wheel 17, the legs 34 of said levers being disposed one above the other and the ends thereof being pivotally connected by substantially vertically disposed pins 35 to diametrically opposite lugs 36 projecting from the adjacent braking elements 30.

The opposite end of each of the levers 33 is provided with a ball 37 which is disposed in a socket member 38' secured to any suitable portion of the truck frame 10, such as transom 13.

A substantially horizontally disposed Y-shaped lever or arm 39 is provided adjacent each of the inner non-rotatable elements 31, substantially opposite the levers 33. Each of the levers 39 is provided with diverging vertically spaced legs 44, the ends of which are pivotally secured by substantially vertically disposed pins 45 to diametrically opposite lugs 46 provided on the adjacent non-rotatable element. The opposite end of each of the levers 39 is pivotally connected to a link 47 which is disposed between the side walls 48 of a channel shaped element 49 extending transversely of the truck substantially from one ball socket member 38 to the other and which is rigidly secured to the transom 13 in any desired manner.

Each of the links 47 is carried by spaced rollers 50, arranged one at each end of each link, adapted to roll on one or the other of the side walls 48 of the channel element 49, the periphery of said rollers being arcuate in shape in the direction of their length to permit rocking of the links within said channel.

Each of the levers 33 is provided with a lug 51 which projects upwardly from the upper leg 34 adjacent the pivot pin 35, while each of the levers 39 is provided with a like lug 52 projecting upwardly from the upper leg 44 thereof in horizontal alignment with the lugs 51. Each of the lugs 51 and 52 is provided with an opening, preferably of greater length, measured in a vertical direction, than width, and extending through these openings in a direction transversely of the truck frame 10, is a rectangular support bar 53. A stop preferably in the form of a washer 54 is provided on each of the opposite ends of the bar 53 and is held thereon by a cotter key 55 or the like extending through the bar. The fit between the bar 53 and the lugs 51 and 52 is slightly loose to permit sliding of said lugs on said bar and to permit a certain angular movement of said lugs relative to said bar.

The bar 53 is pivotally connected to any suitable portion of the truck frame, such as rigid elements 58 extending between and secured at opposite ends to end member 12 and transom 13, by two spaced spring supporting devices 57.

Each of the devices 57 is provided with a downwardly extending plunger 56, the plunger in one device being pivotally connected to bar 53 between the lugs 51 and 52 at one side of the truck, while the plunger 56 in the other device is pivotally connected to bar 53 between lugs 51 and 52 at the opposite side of the truck.

Each of the devices comprises a casing into which the plunger 56 extends and in which said plunger is provided with an enlarged head portion 59 between which and the lower end of the casing is provided a spring 60 acting to urge the plunger 56 in an upwardly direction. The combined pressures of the springs 60 in the two devices is just sufficient to counterbalance the weight of the bar 53, the non-rotatable elements 30 and 31 suspended on said bar, and the adjacent portion of the brake levers 33 and 39 which are connected to said elements.

Each of the plungers 56 is provided with an axil bore in which there is disposed a pin 61 secured at its upper end in a boss 61' depending from the casing of the device and having at its lower end a head 62. A pair of spring seats 63 and 64 are slidably mounted on the pin 61 between the end of boss 61' and the head 62 and between said seats and encircling said pin is disposed a spring 65.

Adjacent the bottom of the bore in each of the plungers 56 is a shoulder 66 adapted to engage the spring seat 63, while secured to each of the plunger heads 59 is a ring 67 which forms a shoulder for engaging the spring seat 64.

The parts of the devices 57 normally assume the position in which they are shown in Fig. 4 of the drawings. It will be noted that with the parts in this position the spring 65 is confined between the spring seats 63 and 64 which are in engagement with the pin head 62 and the boss 61', thereby rendering said spring in each of the devices 57 ineffective. Under this condition the springs 60 act to support the bar 53, non-rotatable elements 30 and 31 and connected ends of the levers 33 and 39.

If, due to irregularities of the track rails 18 or for any other reason, the parts of the brake mechanism carried by the devices 57 tend to move upwardly relative to the truck frame, such movement of the plungers 56 acts through the shoulders 66 to move the spring seats 63 against the opposing pressures of springs 65. In case the parts of the brake mechanism tend to move downwardly relative to the truck frame, such movement of plungers 56 acts through rings 67 to move spring seats 64 against the opposing pressure of springs 65. In other words the springs 65 act to oppose movement of the parts of the mechanism carried by the devices 57 in either direction from their normal position, and the pressure of springs 65 is such as to immediately stop such movement and return the parts to their normal position. More specifically the springs 65 and the parts of the devices 57 which control their operations are provided to dampen oscillation of the non-rotatable elements 30 and 31 due to roughness of the rails 18, or the like.

It will now be evident that since the non-rotatable element 30 and 31 and the connected ends of the brake levers 33 and 39 are supported from the truck frame 10 by the devices 57, said elements are adapted to move vertically with the truck frame 10 relative to the wheels 17 and will therefore assume various positions eccentric to the rotatable elements 28.

In the drawings the non-rotatable elements 30 and 31 are shown in their brake release condition and in concentric relationship with the rotatable elements 28 which relationship they will assume when the vehicle carried by the truck frame 10 is carrying substantially one-half load. When the vehicle carried by the truck frame is empty said frame will be elevated by springs 20 to a position above that shown and the non-rotatable elements 30 and 31 will therefore assume a position somewhat above that in which they are shown in the drawings and will therefore be eccentrically disposed with relation to the rotatable elements 28, while when the vehicle supported by the truck frame 10 is fully loaded said frame will be depressed to a position below that in which it is shown in the drawings and as a consequence the non-rotatable elements 30 and 31 will be somewhat below the position in which they are shown in the drawings and will therefore be eccentrically disposed with relation to the rotatable elements 28. In other words the non-rotatable elements 30 and 31 will assume various positions eccentric to the rotatable elements 28 depending upon the degree of load carried by the vehicle supported on the truck frame 10.

From the above description it will be evident that only the sleeves 21 and rotatable elements 28 of the disk brake mechanism are carried directly by the vehicle wheels 17, all other parts of said mechanism being normally supported by and thereby movable with the truck frame 10.

At the time the non-rotatable elements 30 and 31 are moved into frictional engagement with the rotatable elements 28 for effecting braking thereof and of the wheels 17, as will be later described, it is desired that said non-rotatable elements be in concentric relationship with said rotatable elements and in order to accomplish this, there is associated with each of the levers 33 a substantially vertically disposed centralizing cylinder device 70 containing a pair of like, oppositely working pistons 71, each of which is provided with a hollow piston rod 72 slidably mounted in a suitable bore through the casing of the device.

A chamber 73 formed intermediate each pair of pistons 71 is connected to a pipe 74 through which fluid under pressure is adapted to be supplied to said chamber at the time an application of the brakes is effected and through which fluid under pressure is adapted to be released from said chamber to the atmosphere when the brakes are released, as will be hereinafter more fully described.

Each of the pistons 71 has at its outer face a chamber 75' which is opened to the atmosphere in any desired manner such as by way of clearance space provided between the hollow push rod 72 and the casing through which said rod operates. A spring 75 is provided in each of the chambers 75' to act on the respective pistons 71 for urging said pistons to their normal positions as shown in the drawings.

Each pair of pistons 71 is provided for operating a pair of oppositely disposed like levers 76 which are pivoted intermediate their ends on pins 77 secured in the legs 34 of the levers 33, it being noted that each of said legs is provided with a longitudinal slot 80 in which the respective lever 76 is disposed to operate.

A push rod 78 disposed in each of the hollow piston rods 72 is pivotally connected to the adjacent end of each of the levers 76 while in the opposite end of each of said levers there is provided a roller 79 which obviously constitutes a part of the lever, the two rollers in each pair of levers being so arranged that upon movement toward each other they will engage diametrically opposite upper and lower portions of the cylindrical portion 22 of the adjacent sleeve 21.

Each of the push rods 78 is capable of rocking movement relative to the hollow rod 72 and is provided at its inner end with an enlargement for engaging the piston 71, a ring 78' being secured in each of the rods 72 for engagement with said enlargement in order to move the rods 78 with said piston.

The stroke of all of the pistons 71 is adapted to be the same and to be limited to a fixed predetermined degree from the center of the cylinders 70, said degree being just sufficient to effect substantial engagement between the oppositely disposed rollers 69 and the cylindrical portion 22 of the sleeves 21. In order to thus limit the stroke of pistons 71 any suitable means may be provided, but for the purpose of illustration a yoke 81 is secured to each end of the cylinders 70 for engagement by the ends of the push rods 78.

When the brakes on the vehicle truck are released, the piston chambers 73 are vented, and the springs 75 acting on the pistons 71 move said pistons to their normal position as shown in the drawings. Consequently, the levers 76 are operated to pull rollers 79 in the ends thereof away from the cylindrical portion 22 of the sleeves 21 to the position shown in the drawings in order to permit the non-rotatable elements 30 and 31 and the levers 33 and 39 to freely move with the truck frame 10 relative to the rotatable elements 28, due to the action of the spring supporting devices 57, above described.

When an application of the brake is effected, as will hereinafter be described, fluid under pressure is adapted to be supplied to the piston chambers 73 and act therein on the pistons 71 to move the push rods 78 outwardly against the opposing pressure of springs 75 and into engagement with the yoke 81.

If at the time the pistons 71 are thus operated the truck frame is, for instance, in its empty position and the non-rotatable elements 30 and 31 are therefore raised somewhat above the rotatable elements 28, the uppermost pistons 71 will move outwardly their full stroke as just described. However, after a slight outward movement of the lowermost pistons 71, the rollers 79 in the ends of the connected levers 76 will engage the cylindrical portions 22 of the sleeves 21. The lowermost rollers 79 then become, in effect, fixed fulcrums for the connected levers 76, and the remainder of the stroke of the connected pistons 71 then acts through the pins 77 to rock the levers 33 about the ball ends 37 in a clockwise direction as viewed in Fig. 2 of the drawings and thereby draw the non-rotatable elements 30 and 31 downwardly until the actuating pistons 71 engage the yokes 81, at which time the non-rotatable elements 30 and 31 will have assumed a position in which they are concentric with the rotatable elements 28.

If at the time fluid under pressure is supplied to piston chambers 73 the truck frame is in a depressed, full load position in which the non-rotatable elements 30 and 31 are positioned somewhat below the rotatable elements 28, the lowermost pistons 71 will freely move their full stroke and thereby operate the connected levers 76 and rollers 79 controlled thereby, as above described. Under this condition, however, the uppermost rollers 79 will engage the cylindrical portions 22 of the sleeves 21 upon slight movement of the upper pistons 71, after which said rollers in effect become fixed fulcrums for the connected levers 76 so that the remaining movement of said pistons act through said levers to force the levers 33 and non-rotatable elements 30 and 31 downwardly relative to the rotatable elements 28. This relative movement ceases when the upper most pistons 71 complete their stroke, at which time the non-rotatable elements 30 and 31 will have obtained their braking position in which they are substantially concentric with the rotatable elements 28.

When both pairs of pistons 71 have moved outwardly their full stroke as above described, it will be noted that the rollers 69 on the opposite sides of the cylindrical portions 22 of the sleeves 21 will be spaced apart a distance substantially equal to the diameter of such portions of the sleeves and in this condition are adapted to act to hold the non-rotatable elements 30 and 31 in concentric relationship with the rotatable elements 28 during braking, which will be hereinafter described.

In case the vehicle carried by the truck is only substantially half loaded, the truck frame and thereby the non-rotatable elements 30 and 31 will be in a position in which said elements are in substantial concentric relationship, with the rotatable elements 28 as shown in the drawings. When the pistons 71 are moved outwardly under this condition their movement is free of sleeves 21 and they merely act to move the levers 76 and thereby the rollers 79 to their braking position in substantial engagement with the opposite sides of the cylindrical portions 22 of the sleeves 21, in which case the rollers serve to maintain the non-rotatable elements in alignment with the rotatable elements during braking, as above mentioned.

From the above description it will now be evident that regardless of the normal position of the non-rotatable elements 30 and 31 with respect to the rotatable elements 28, that is, whether said non-rotatable elements are raised or lowered with relation to the rotatable elements, the operation of the pistons 71 at the time an application of the brakes is effected will act through the levers 76 and 33 to draw the non-rotatable elements into concentric braking alignment with the rotatable elements 28.

When in effecting a release of the brakes fluid under pressure is vented from the chambers 73 between the pistons 71 the pressure of said pistons applied through the rollers 79 to the sleeves 21 is relieved and springs 75 return said pistons 75 and thereby the levers 76 and rollers 79 to the normal position, as shown in the drawings. The spring supporting device 57 then act to shift the non-rotatable elements 30 and 31 back to their normal position with respect to the truck frame 10.

It will be noted that at the time an application of the brakes is effected the centralizing cylinders 70, levers 76 and rollers 79 act only to centralize the two outside non-rotatable elements 30. The movement of these outside non-rotatable elements into concentric relationship with the rotatable elements acts however through the rod 53 to effect simultaneous movement of the inside non-rotatable elements 31 into braking relation with the rotatable elements 38.

As hereinbefore described the support springs 60 are provided merely to counterbalance the weight of the non-rotatable elements 30 and 31 and other parts of the mechanism connected thereto; the inner springs 65 being normally ineffective, but provided to dampen oscillation of the brake mechanism while the brakes are released. Either one or both of these springs opposes movement of the non-rotatable elements into concentric relationship with the rotatable elements, but this action however is incidental.

A conventional type of brake cylinder device 92 is disposed between the two brake levers 39 with its axis parallel to and in substantially the same horizontal plane as that of axle 16, said brake cylinder device being rigidly mounted on any suitable part of the truck frame 10 such as a bracket 93 which may be secured to transom 13.

The brake cylinder device 92 comprises a piston 94 slidably mounted therein and having a rod 95 extending through one end of the cylinder, the end of said rod being pivotally connected to one end of a live brake lever 96 the other end of which is pivotally connected to one of the links 47. A lug 97 projects from the opposite end of the brake cylinder device 92 and pivotally connected to said lug is one end of a dead lever 98 the other end of which is pivotally connected to the other link 47. The levers 96 and 98 are pivotally connected together intermediate their ends by a tie rod 99. Each pair of levers 33 and 39 is pivotally connected together intermediate their ends by a tie rod 91.

The brake cylinder device 92 is connected to a pipe 100 through which fluid under pressure is adapted to be supplied to the pressure face of the piston 94 for effecting an application of the brakes, and through this pipe fluid under pressure is adapted to be released from the pressure face of said piston in order to effect a release of the brake. A release spring 101 is provided in the brake cylinder device 92 to act on the opposite face of the piston 94 for moving said piston to the usual release position shown in the drawings, in effecting a release of the brakes.

Between a fluid pressure supply pipe 102 to which pipe 74 leading to the centralizing cylinder devices 70 is connected, and the brake cylinder pipe 100, a delay valve device 103 is provided for delaying the operation of the brake cylinder device 92 until after the centralizing cylinder devices 70 are operated to move the non-rotatable elements 30 and 31 into concentric relationship with the rotatable elements 28.

The delay valve device 103 comprises a casing containing a valve piston 104 having at one side a chamber 105 which is open to the atmosphere through a passage 106 and which contains a spring 107 for urging said valve piston into engagement with a seat rib 108 provided at its opposite side. The space within the seat rib 108 is open at all times to the pipe 102 while the space outside of said seat rib is open to a passage 109 to which the brake cylinder pipe 100 is connected. The passage 109 is also connected by a passage 110 to chamber 105 when the valve piston 104 is in engagement with the seat rib 108 but communication between the passage 110 and chamber 105 is adapted to be closed upon movement of the valve piston 104 out of the position shown in the drawings, as will be hereinafter described.

In operation, fluid under pressure is adapted to be supplied to and released from the pipe 102 in any desired manner, such as through the medium of the usual triple valve device (not shown) employed in connection with the conventional type of fluid pressure brake equipment used on railway vehicles, in order to effect an application and a release of the brakes on the vehicle, respectively.

When fluid under pressure is supplied to pipe 102 in order to effect an application of the brakes, it first flows to pipe 74 and thence to the centralizing cylinder devices 70 for effecting operation thereof to move the non-rotatable elements 30 and 31 into concentric, cooperative relationship with the rotatable elements 28.

The pressure of spring 107 on the delay valve piston 104 is sufficient to hold said valve piston in sealing engagement with the seat rib 108 until after sufficient pressure has been obtained in the centralizing cylinder devices 70 for centralizing the non-rotatable elements 30 and 31, as just described. A slight increase in the pressure in pipe 102 acting on the lower face of the valve piston 104 within the seat rib 108 is then adapted to overcome the opposing pressure of the spring 107 and move the valve piston 104 out of engagement with seat rib 108 and into sealing engagement with a gasket 111 for thereby closing communication between passage 110 and the atmospheric vent port 106.

When the valve piston 104 is thus moved out of engagement with the seat rib 108 communication is established between the pipe 102 and pipe 100 leading to the brake cylinder device 92 whereupon fluid under pressure flows from pipe 102 to said brake cylinder device and therein acts on the piston 94 to move said piston and thereby the rod 95 outwardly of the device.

This movement of rod 95 acts to move the connected end of the live lever 96 away from the adjacent end of the dead lever 98 connected to the brake cylinder device, and due to the action of tie rod 99 the opposite ends of said levers are drawn toward each other. Through the medium of links 47 the connected ends of levers 39 are thereby drawn toward each other and away from the ball ends 37 of the levers 33, and since the levers 39 and 33 are connected together by links 91, the ends of said levers carrying the non-rotatable elements 30 and 31 are moved toward each other and thereby force said elements into frictional contact with the adjacent rotatable elements 28 for effecting braking of said rotatable elements and thereby the wheels 17.

The pressure with which the non-rotatable elements 30 and 31 are forced into contact with the rotatable elements 28, and thereby the degree with which the wheels 17 are braked, may be varied as desired according to the pressure of fluid supplied to the brake cylinder device 92 for acting on the piston 94.

It will be noted that when the non-rotatable elements 30 and 31 are in braking engagement with the rotatable elements 28, the levers 33 and 39 act to hold the non-rotatable elements against turning with the rotatable elements 28, the outer ends of levers 33 being supported by sockets 38' while the outer ends of levers 39 are supported by the rollers 50 in the ends of the links 47; said rollers being therefore pressed against one or the other side walls 48 of the channel element 49. The rollers 50 are provided to facilitate movement of the links 47 in channel 49 during the time the braking elements are in frictional contact.

In order to effect a release of the brakes after an application fluid under pressure is vented from pipe 102 and thus from the pressure face of the brake cylinder piston 94 and from chambers 73 in the centralizing cylinder devices 70, thereby permitting the return spring 101 in the brake cylinder device to move the brake cylinder piston 94 back to its release position for relieving the braking pressure between the non-rotatable elements 30 and 31 and the rotatable elements 28 and for permitting the spring supporting devices 57 to act to return the non-rotatable elements to their normal position with respect to the truck frame 10.

When in effecting a release of the brakes the pressure of fluid in pipe 102 acting on the lower face of the valve piston 104 is educed sufficiently, the spring 107 moves said valve piston out of engagement with the gasket 111 and back to its normal position in engagement with the seat rib 108, and in this position the passage 110 is open to chamber 105 and from thence to the atmosphere through passage 106, so that any fluid remaining in the brake cylinder device 92 at this time is released by way of said passages.

As the brake cylinder piston 94 is forced to its release position by the release spring 101 the end of the piston rod 95 is drawn towards the brake cylinder device and thereby acts to operate levers 96 and 98 to move their outer ends apart. This action of the levers 96 and 98 acts to move the links 47 away from each other and thereby the connected ends of the levers 39 are moved toward the ball ends 37 of the levers 33. As a result, the ends of the levers 39 and 33 connected to the non-rotatable elements 30 and 31 are moved apart thereby pulling said elements out of contact with the rotatable elements 28.

The non-rotatable elements 30 are thus moved until lugs 51 on the levers 33 engage the adjacent washers 54 on the rod 53 which define the release position of said elements. After the release position of the elements 30 is thus obtained further movement of the links 47 away from each other acts to rock the levers 39 relative to the levers 33 and this rocking continues until the brake cylinder piston 94 reaches its release position thereby insuring a predetermined spacing between the non-rotatable elements 31 and the rotatable elements 28.

In the structure above described the brake cylinder device 92 is interposed between the levers 96 and 98 but in certain vehicle trucks there may not be sufficient space to install a brake cylinder in this location particularly if the truck requires a greater degree of braking and therefore larger braking elements and a larger brake cylinder device for controlling the operation thereof.

The modified form of the invention shown in Fig. 6 of the drawings is provided to overcome the difficulty just described. According to this modification the brake cylinder device, indicated by the reference character 112, is disposed on the opposite side of the axle 16 where adequate space transversely of the truck is available. The brake cylinder device 112 is secured to any suitable fixed part of the truck frame such as the end member 12 at a level above the axle 16. Live and dead brake levers 113 and 114 connected at one end to the links 47 and connected together intermediate their ends by a tie rod 115, extend over the top of the axle 16 for connection with the brake cylinder device 112. These levers are bent so that adjacent the brake cylinder device the ends thereof are spaced apart sufficiently so that the end of the live lever 113 may be pivotally connected to the piston rod 95, while the bifurcated end of the dead lever 114 may be connected to oppositely disposed pins or bosses 115 projecting from the brake cylinder device adjacent the pressure end thereof.

The brake cylinder device 112 is disposed sufficiently high on the end member 12 that the levers 113 and 114 will not engage the axle 16 in the lowermost position which the truck frame 10 will assume in use. The operation of this form of the invention is the same as that of the form hereinbefore described.

From the above description of the improved disk brake mechanisms it will be noted that the weight of the non-rotatable elements 30 and 31, the brake cylinder device and the various levers of the mechanisms are at all times supported by the truck frame 10. The axle 16 is never subjected to any part of the weight of the disk brake mechanism while the wheels 17 normally carry only the rotatable elements 28 and sleeves 21. At the time an application of the brake is effected the wheels 17 are subjected to the slight additional load of one or both of the spring 60 and 65 upon operation of the centralizing cylinders 70 but this additional load is so small as compared to the total load carried by said wheels as to be substantially immaterial.

While two illustrative embodiments of the invention have been described in detail it is not the intention to limit the scope to these embodiments or otherwise than by the terms of the appended claims.

Having now described my invention, what I claim as new and desire to secure by Letters Patent, is:

1. A brake mechanism for a wheel of a vehicle truck comprising rotatable and non-rotatable annular friction braking elements adapted to frictionally engage for braking said wheel, means for controlling movement of said elements into and out of frictional engagement, means for supporting said non-rotatable element in cooperative relation with said rotatable element, a rigid sleeve like element having at one end an outwardly flaring frusto-conical shaped portion secured to said wheel adjacent the periphery thereof, and means removably securing said rotatable element to the opposite end of said sleeve in concentric relation with said wheel and operative to rotate said rotatable element with said wheel.

2. A brake mechanism for a wheel of a vehicle truck comprising rotatable and non-rotatable annular friction braking elements adapted to frictionally engage for braking said wheel, means for controlling movement of said elements into and out of frictional engagement, means for supporting said non-rotatable element in cooperative relation with said rotatable element, a rigid sleeve like element having at one end an outwardly flaring frusto-conical shaped portion secured to said wheel adjacent the periphery thereof, said sleeve having at the opposite end an annular flange, and means securing said rotatable element to said flange in concentric relation with said wheel and adapted to rotate said rotatable element with said wheel.

3. A brake mechanism for a pair of wheels of a vehicle truck, having a truck frame resiliently carried by said wheels, said mechanism comprising adjacent each of said wheels a set of rotatable and non-rotatable annular friction braking elements, means secured to each of said wheels for supporting the adjacent rotatable element for rotation with the connected wheel, means for supporting said non-rotatable elements in cooperative relation with said rotatable elements, a brake cylinder device carried by said frame, and levers for each of said sets of braking elements operatively connected at one end to the respective set of braking elements, means associated with said frame supporting the opposite ends of said levers, and means operatively connecting said levers to said brake cylinder device, said brake cylinder device being operative to control the operation of said levers for controlling the braking operation of said braking elements.

4. A brake mechanism for a pair of wheels of a vehicle truck having a truck frame resiliently carried by said wheels, said mechanism comprising adjacent each of said wheels a set of rotatable and non-rotatable annular friction braking elements, means secured to each of said wheels for supporting the adjacent rotatable element for rotation with the connected wheel, means for supporting said non-rotatable elements in cooperative relation with said rotatable elements, a brake cylinder device carried by said frame, a dead lever connected to said brake cylinder device, a live lever connected to said brake cylinder device, means connecting one of said levers to one of said sets of braking elements and the other of said levers to the other set of braking elements, and means connecting said levers together whereby said brake cylinder device is connected to both of said sets of braking elements for controlling the operation thereof.

5. A brake mechanism for the wheels of a vehicle truck having a frame and spring means carried by said wheels resiliently supporting said frame, said mechanism comprising an annular rotatable friction braking element, an annular non-rotatable friction braking element at each side of said rotatable element, means connected to said non-rotatable elements for moving same into frictional braking engagement with said rotatable element for braking one of said wheels, an annular element rigidly secured to said one wheel and supporting said rotatable element for rotation with said wheel, means carried by said frame for normally supporting said non-roatable elements for movement with said frame and operative to render said non-rotatable element movable in a vertical direction relative to said frame, means associated with one of said non-rotatable elements and cooperative with said annular element for moving said one non-rotatable element in a vertical direction relative to said frame into cooperative relation with said rotatable element, and means connecting said non-rotatable elements operative upon movement of said one non-rotatable element into cooperative relation with said rotatable element to effect movement of the other non-rotatable element into cooperative relation with said rotatable element.

6. A brake mechanism for the wheels of a vehicle truck having a frame and spring means carried by said wheels resiliently supporting said frame, said mechanism comprising a rigid circular member associated with one of said wheels for rotation therewith in concentric relation to said wheel, an annular rotatable friction braking element secured to said circular member in concentric relation and for rotation therewith, an annular non-rotatable friction braking element disposed at each side of said rotatable element for frictionally engaging said rotatable element for braking said wheel, said non-rotatable elements being capable of movement vertically relative to said circular element, means carried by said frame for resiliently supporting said non-rotatable elements, means associated with one of said non-rotatable elements and cooperative with said circular element for effecting movement of said one non-rotatable element into concentric cooperative relation with said rotatable element, and means connecting said non-rotatable elements operative upon movement of the one of said non-rotatable elements into cooperative relation with said rotatable element to effect movement of the other non-rotatable element into cooperative relation with said rotatable element.

7. A disk brake mechanism for a pair of oppositely disposed wheels of a vehicle truck having a frame and spring means carried by said wheels and resiliently supporting said frame, said mechanism comprising an annular rotatable friction braking element disposed adjacent each of said wheels and secured thereto in concentric relation, an annular non-rotatable friction braking element disposed at each of the opposite faces of said rotatable elements and adapted to frictionally engage said faces for braking said wheels, said non-rotatable elements being capable of movement vertically relative to said rotatable elements, resilient means carried by said frame and connected to said non-rotatable elements for supporting said non-rotatable elements, a circular element associated with each of said wheels in concentric relation therewith, mechanism associated with one of the non-rotatable elements adjacent each wheel and cooperative with the adjacent circular element for moving the associated non-rotatable elements into concentric relation with the adjacent rotatable elements, and means connecting the non-rotatable elements adjacent each wheel operative upon movement of the one into concentric relation with the adjacent rotatable element to effect movement of the other into concentric relation with the adjacent rotatable element.

8. A disk brake mechanism for a pair of oppositely disposed wheels of a vehicle truck having a frame and spring means carried by said wheels and resiliently supporting said frame, said mechanism comprising an annular rotatable friction braking element disposed adjacent each of said wheels and secured thereto in concentric relation, an annular non-rotable friction braking element disposed at each of the opposite faces of said rotatable elements, said non-rotatable elements being capable of movement vertically relative to said rotatable elements, resilient means carried by said frame and connected to said non-rotatable elements for supporting said non-rotatable elements, a circular element associated with each of said wheels in concentric relation therewith, mechanism associated with one of the non-rotatable elements adjacent each wheel and cooperative with the adjacent circular element for moving the associated non-rotatable element into concentric relation with the adjacent rotatable element, means connecting the non-rotatable elements adjacent each wheel operative upon movement of the one into concentric relation with the adjacent rotatable element to effect movement of the other into concentric relation with the adjacent rotatable element, a fluid pressure operatel brake cylinder device carried by and movable with said frame, and oppositely disposed lever system connecting said brake cylinder device to the non-rotatable elements adjacent each of said wheels, said brake cylinder device being adapted to be operated by fluid under pressure to operate said lever systems for moving the non-rotatable elements adjacent each of said wheels into frictional braking engagement with the adjacent rotatable braking elements.

9. A brake mechanism for a vehicle truck having wheels, a frame, and spring means carried by said wheels and supporting said frame, said mechanism comprising annular rotatable and non-rotatable friction braking elements adapted upon frictional engagement to brake one of said wheels, means securing said rotatable element to said wheel in concentric relation for rotation therewith, said non-rotatable element being capable of movement vertically relative to said rotatable element, means carried by said frame for yieldably supporting said non-rotatable element, a circular element associated with said wheel in concentric relation therewith, a pair of levers operatively connected to said non-rotatable element and arranged with one end of one lever above said circular element and one end of the other lever below said circular element, means connected to said levers operative to actuate said levers to move said ends into engagement with substantially opposite top and bottom portions of said circular element, and means for limiting the extent of movement of each of said levers to a degree whereby upon substantial engagement of said levers with said circular element said non-rotatable element will be in substantial concentric relation with said rotatable element.

10. A brake mechanism for a vehicle truck having wheels, a frame, and spring means carried by said wheels and suporting said frame, said mechanism comprising annular rotatable and non-rotatable friction braking elements adapted upon frictional engagement to brake one of said wheels, means securing said rotatable element to said wheel in concentric relation for rotation therewith, said non-rotatable element being capable of movement vertically relative to said rotatable element, means carried by said frame for yieldably supporting said non-rotatable element, a circular element associated with said wheel in concentric relation therewith, a pair of levers operatively connected to said non-rotatable element and arranged with one end of one lever above said circular element and one end of the other lever below said circular element, means connected to said levers operative to actuate said levers to move said ends into engagement with substantially opposite top and bottom portions of said circular element, and means for limiting the extent of movement of each of said levers to a degree whereby upon substantial engagement of said levers with said circular element the portions of said circular element engaged by said stop means will be substantially diametrically opposite each other.

11. A brake mechanism for a vehicle truck having wheels, a frame, and spring means carried by said wheels and supporting said frame, said mechanism comprising annular rotatable and non-rotatable friction braking elements adapted upon frictional engagement to brake one of said wheels, means securing said rotatable element to said wheel in concentric relation for rotation therewith, said non-rotatable element being capable of movement vertically relative to said rotatable element, means carried by said frame for yieldably supporting said non-rotatable element, a circular element associated with said wheel in concentric relation therewith, an arm connected at one end to said frame and at the opposite end to said non-rotatable element and said opposite end being movable with said non-rotatable element, a pair of levers pivotally connected to said arm and disposed to engage substantially top and bottom portions of said circular element, a cylinder device connected to said levers and adapted to be operated by fluid under pressure for moving said levers into substantial engagement with said circular element, and means for limiting the extent of movement of each of said levers by said cylinder device to a degree whereby upon substantial engagement with the top and bottom portions of said circular element said non-rotatable element will be in substantial concentric relation with said rotatable element.

12. A brake mechanism for a vehicle truck having wheels, a frame, and spring means carried by said wheels and supporting said frame, said mechanism comprising annular rotatable and non-rotatable friction braking elements adapted upon frictional engagement to brake one of said wheels, means securing said rotatable element to said wheel in concentric relation for rotation therewith, said non-rotatable element being capable of movement vertically relative to said rotatable element, means carried by said frame for yieldably supporting said non-rotatable element, a circular element associated with said wheel in concentric relation therewith, an arm connected at one end to said frame and at the opposite end to said non-rotatable element and said opposite end being movable with said non-rotatable element, a pair of levers disposed one above the other with one end of one lever disposed above said circular element and the adjacent end of the other lever disposed below said circular element, and said levers being pivotally connected to said arm, and a vertically operating cylinder device carried by said arm and connected to both of said levers and adapted to be operated by fluid under pressure for operating each of said levers independently of each other to move said ends of said levers into engagement with substantially opposite top and bottom portions of said circular element, and means operative to limit the movement of each of said levers to a degree whereby upon substantial engagement of said levers with said circular element, said non-rotatable element will be in substantial concentric relation with said rotatable element.

13. A brake mechanism for a vehicle truck having wheels, a frame, and spring means carried by said wheels and supporting said frame, said mechanism comprising annular rotatable and non-rotatable friction braking elements adapted upon frictional engagement to brake one of said wheels, means securing said rotatable element to said wheel in concentric relation for rotation therewith, said non-rotatable element being capable of movement vertically relative to said rotatable element, means carried by said frame for yieldably supporting said non-rotatable element, a circular element associated with said wheel in concentric relation therewith, an arm connected at one end to said frame and at the opposite end to said non-rotatable element and said opposite end being movable with said non-rotatable element, a pair of oppositely disposed like levers arranged with one end of one lever above said circular element and one end of the other lever below said circular element and both of said levers being pivotally connected to said arm at one side of said circular member, a cylinder device connected to said levers and adapted to be operated by fluid under pressure to turn the opposite ends of said levers into substantial engagement with said circular element, and means for limiting the movement of each of said levers to the same degree.

14. A brake mechanism for a vehicle truck having wheels, a frame, and spring means carried by said wheels and supporting said frame, said mechanism comprising annular rotatable and non-rotatable friction braking elements adapted upon frictional engagement to brake one of said wheels, means securing said rotatable element to said wheel in concentric relation for rotation therewith, said non-rotatable element being capable of movement vertically relative to said rotatable element, means carried by said frame for yieldably supporting said non-rotatable element, a circular element associated with said wheel in concentric relation therewith, an arm connected at one end to said frame and at the opposite end to said non-rotatable element and said opposite end being movable with said non-rotatable element, a pair of oppositely disposed like levers arranged with one end of one lever above said circular element and one end of the other lever below said circular element said levers being arranged one above the other and being pivotally connected intermediate their ends to said arm, a substantially vertically arranged cylinder device carried by said arm between the opposite ends of said levers, a pair of oppositely working pistons in said cylinder device, a rod operatively connecting one of said pistons to the adjacent end of one of said levers, a rod operatively connecting the other of said pistons to the adjacent end of the other of said levers, said pistons being adapted to be moved in opposite directions by fluid under pressure for moving the free ends of said levers into substantial engagement with substantially top and bottom portions of said circular element, and means for limiting the stroke of both of said pistons to substantially the same degree.

15. A brake mechanism for a vehicle truck having wheels, a frame, and spring means carried by said wheels and supporting said frame, said mechanism comprising a rigid annular sleeve secured to the inner face of one of said wheels in concentric relation therewith for rotation with said wheel, an annular rotatable friction braking element secured to said sleeve in concentric relation and for rotation therewith, an annular non-rotatable friction braking element disposed at each side of said rotatable element for frictionally engaging the opposite faces of said rotatable element to brake said wheel, resilient means carried by said frame for supporting both of said non-rotatable elements, a pair of spaced substantially horizontally extending rigid elements pivotally connected at one end to said frame and at their opposite ends each pivotally connected to one of said non-rotatable elements for movement therewith vertically and for securing said non-rotatable elements against rotation with said rotatable element, means connecting said rigid elements and non-rotatable elements for movement together in a vertical direction, and mechanism carried by one of said rigid elements and cooperative with said sleeve for moving said non-rotatable elements relative to said rotatable element into substantial concentric relation therewith.

16. A brake mechanism for a vehicle truck having wheels, a frame, and spring means carried by said wheels and supporting said frame, said mechanism comprising a rigid annular sleeve secured to the inner face of one of said wheels in concentric relation therewith for rotation with said wheel, an annular rotatable friction braking element secured to said sleeve in concentric relation and for rotation therewith, an annular non-rotatable friction braking element disposed at each side of said rotatable element for frictionally engaging the opposite faces of said rotatable element to brake said wheels, resilient means carried by said frame for supporting both of said non-rotatable elements, a pair of spaced substantially horizontally extending rigid elements pivotally connected at one end to said frame and at their opposite ends each pivotally connected to one of said non-rotatable elements for movement therewith vertically and for securing said non-rotatable elements against rotation with said rotatable element, means connecting said rigid elements and non-rotatable elements for movement together in a vertical direction, mechanism carried by one of said rigid elements and cooperative with said sleeve for moving said non-rotatable elements relative to said rotatable element and into substantial concentric relation therewith, a tie rod pivotally connected to said rigid elements intermediate their ends, and a brake cylinder device carried by said frame and operatively connected to one of said rigid elements for effecting the operation of both of said rigid elements to move said non-rotatable elements into frictional braking engagement with said rotatable element.

17. A brake mechanism for a vehicle truck having wheels, a frame and spring means carried by said wheels and supporting said frame, said mechanism comprising an annular rotatable friction braking element, means securing said element to one of said wheels for rotation therewith, an annular non-rotatable friction braking element, means for supporting said non-rotatable element in cooperative braking relation with said rotatable element, a rigid element connected at one end to said non-rotatable element for holding said non-rotatable element against rotation, a channel like element associated with said frame, a member disposed to move between the side walls of said channel element, and pivotally connected to the other end of said rigid element, roller means supporting said member in said channel element, and a brake cylinder device carried by said frame and connected to said rigid element for effecting operation thereof to move said non-rotatable element into frictional engagement with said rotatable element.

18. A brake mechanism for a vehicle truck having wheels, a frame and spring means carried by said wheels and supporting said frame, said mechanism comprising an annular rotatable friction braking element, means securing said element to one of said wheels for rotation therewith, an annular non-rotatable friction braking element, means for supporting said non-rotatable element in cooperative braking relation with said rotatable element, a rigid element connected at one end to said non-rotatable element for holding said non-rotatable element against rotation, a channel like element associated with said frame, a member disposed to move between the side walls of said channel element, and pivotally connected to the other end of said rigid element, roller means supporting said member in said channel element, a brake lever having one end pivotally connected to said member, and a brake cylinder device carried by said frame for operating said brake lever and thereby said rigid means to effect movement of said non-rotatable element into frictional braking engagement with said rotatable element.

19. A brake mechanism for a pair of oppositely disposed wheels of a vehicle truck having a frame and spring means carried by said wheels and resiliently supporting said frame, said mechanism comprising an annular, rotatable friction braking element disposed adjacent and secured to each of said wheels for rotation therewith, an annular non-rotatable friction braking element for frictionally engaging each of said rotatable elements, means for supporting each of said non-rotatable elements in cooperative braking relation with the adjacent rotatable element, a channel like element associated with said frame and extending transversely thereof, a rigid element for each of said non-rotatable elements having one end connected to the non-rotatable element and the opposite end disposed to move in said channel, and a brake cylinder device carried by said frame and interposed between and operatively connected to each of said rigid elements for effecting movement thereof to move said non-rotatable elements into frictional braking engagement with said rotatable element, one or the other of the side walls of said channel like element cooperating with the adjacent ends of said rigid elements to hold said non-rotatable elements against turning with said rotatable elements.

20. A brake mechanism for a pair of oppositely disposed wheels of a vehicle truck having a frame and spring means carried by said wheels and resiliently supporting said frame, said mechanism comprising an annular, rotatable friction braking element disposed adjacent and secured to each of said wheels for rotation therewith, an annular non-rotatable friction braking element for frictionally engaging each of said rotatable elements, means for supporting each of said non-rotatable elements in cooperative braking relation with the adjacent rotatable element, a channel like element associated with said frame and extending transversely thereof, a pair of links disposed between the side walls of said channel element, rollers for supporting said links on the side walls of said channel element, a rigid element pivotally connected at one end to one of said non-rotatable elements and at the opposite end to one of said links, another rigid element pivotally connected at one end to the other non-rotatable element and at the opposite end to the other link, said rigid elements being operative to hold said non-rotatable elements against turning with said rotatable element, a pair of spaced brake levers one of which is pivotally connected at one end to each of said links, and a brake cylinder device secured to said frame and connected to said brake levers for effecting the operation thereof and thereby said rigid elements for moving said non-rotatable elements into frictional braking engagement with said rotatable elements.

21. A brake mechanism for a wheel and axle assembly of a vehicle truck having a frame and spring means carried by said assembly and resiliently supporting said frame, said mechanism comprising an annular rotatable friction braking element encircling said axle and disposed adjacent and secured to each of said wheels for rotation therewith, an annular non-rotatable friction braking element for frictionally engaging each of said rotatable elements, means for supporting each of said non-rotatable elements in cooperative braking relation with the adjacent rotatable element, a pair of rigid, substantially horizontally extending elements disposed at one side of said axle, means associated with said frame supporting one end of said rigid elements, the opposite end of each of said rigid elements being connected to one of said non-rotatable elements for holding said non-rotatable elements against turning with said rotatable elements, a pair of substantially horizontally disposed spaced brake levers disposed at said one side of said axle between said rigid elements, means pivotally connecting one end of each of said levers to the adjacent rigid element, and a brake cylinder device disposed between and operatively connected to the opposite ends of said levers for effecting the operation thereof and of the connected rigid elements for moving said non-rotatable elements into frictional braking engagement with said rotatable elements, and means securing said brake cylinder device to said frame.

22. A brake mechanism for a wheel and axle assembly of a vehicle truck having a frame and spring means carried by said assembly and resiliently supporting said frame, said mechanism comprising an annular rotatable friction braking element encircling said axle and disposed adjacent and secured to each of said wheels for rotation therewith, an annular non-rotatable friction braking element for frictionally engaging each of said rotatable elements, means for supporting each of said non-rotatable elements in cooperative braking relation with the adjacent rotatable element, a pair of rigid, substantially horizontally extending rigid elements disposed at one side of said axle, means associated with said frame supporting one end of said rigid elements, the opposite end of each of said rigid elements being connected to one of said non-rotatable elements for holding said non-rotatable elements against turning with said rotatable elements, a brake cylinder device secured to said frame at the opposite side of said axle, and a pair of spaced brake levers pivotally connected at one end to said brake cylinder device and extending over the top of said axle in spaced relation thereto, the opposite end of each of said levers being pivotally connected to one of said rigid elements, said brake cylinder device being operative to effect movement of said levers and thereby said rigid elements to effect movement of said non-rotatable elements into frictional braking engagement with said rotatable elements.

23. A brake mechanism for a wheel of a vehicle, said mechanism comprising a spool like element arranged in concentric relation with said wheel and having one end rigidly secured to said wheel, the other end of said element constituting a friction brake element having friction faces on its opposite sides, a pair of non-rotatable brake elements movable into frictional braking engagement with said friction faces, a pair of operatively connected levers arranged one on each side of the brake element on said spool and operative to move the non-rotatable brake elements into braking engagement with said friction faces, and means for actuating said levers.

24. A brake mechanism for a wheel of a vehicle, said mechanism comprising a spool like element arranged in concentric relation with said wheel and having one end rigidly secured to said wheel, the other end of said element constituting a friction brake element having friction faces on its opposite sides, a pair of non-rotatable brake elements movable into frictional braking engagement with said friction faces, a pair of levers arranged one on each side of the brake element on said spool and operative to move the non-rotatable brake elements in to braking engagement with said friction faces, means operatively connecting said levers together at a point located outwardly beyond the periphery of the brake element on the spool, and means for actuating said levers.

25. A brake mechanism for a wheel of a vehicle truck comprising vertically disposed rotatable and non-rotatable annular friction braking disks adapted to frictionally engage for braking said wheel, actuating means for controlling movement of said disks into and out of frictional engagement, means independent of said actuating means for supporting said non-rotatable disk in cooperative relation with said rotatable disk, a rigid sleeve like element having at one end an outwardly flaring frusto-conical shaped portion secured at its outer end to said wheel, and means removably securing said rotatable element disk to the opposite end of said sleeve in concentric relation with said wheel and operative to rotate said rotatable disk with said wheel.

26. A brake mechanism for a wheel of a vehicle truck comprising vertically disposed rotatable and non-rotatable annular friction braking disks adapted to frictionally engage for braking said wheel, actuating means for controlling movement of said disks into and out of frictional engagement, means independent of said actuating means for supporting said non-rotatable disk in cooperative relation with said rotatable disk, a rigid sleeve like element having at one end an outwardly flaring frusto-conical shaped portion secured at its outer end to said wheel, said sleeve at the opposite end carrying said rotatable disk in concentric relation with and for rotation with said wheel.

CLYDE C. FARMER.